United States Patent
Luo et al.

(10) Patent No.: US 11,204,834 B1
(45) Date of Patent: Dec. 21, 2021

(54) IMPLEMENTATION OF KEEPING DATA INTEGRITY IN MULTIPLE DIMENSIONS

(71) Applicant: Sage Microelectronics Corporation, Campbell, CA (US)

(72) Inventors: Jianjun Luo, Campbell, CA (US); Hailuan Liu, Zhejiang (CN); Chris Tsu, Campbell, CA (US); Ying He, Campbell, CA (US)

(73) Assignee: Sage Microelectronics Corporation, Campbell, CA (US)

(*) Notice: Subject to any disclaimer, the term of this patent is extended or adjusted under 35 U.S.C. 154(b) by 19 days.

(21) Appl. No.: 17/033,730

(22) Filed: Sep. 26, 2020

(51) Int. Cl.
*G06F 11/10* (2006.01)
*G06F 3/06* (2006.01)

(52) U.S. Cl.
CPC ........ *G06F 11/1068* (2013.01); *G06F 3/0619* (2013.01); *G06F 3/0638* (2013.01); *G06F 3/0679* (2013.01)

(58) Field of Classification Search
CPC .................................................. G06F 11/1068
USPC ......................... 714/764, 763, 765, 767, 768
See application file for complete search history.

(56) References Cited

U.S. PATENT DOCUMENTS

| | | | | |
|---|---|---|---|---|
| 5,459,742 A | * | 10/1995 | Cassidy | G06F 11/1044 714/769 |
| 5,530,849 A | * | 6/1996 | Hanushevsky | G06F 16/10 |
| 5,754,753 A | * | 5/1998 | Smelser | G06F 11/1012 714/6.13 |

* cited by examiner

*Primary Examiner* — Fritz Alphonse
(74) *Attorney, Agent, or Firm* — Joe Zheng

(57) ABSTRACT

Techniques for Implementation of keeping data integrity in multiple dimensions are described. A single but relatively complicated engine is used to encode a line of original data bits in one dimension once and for all, while a linear array of simple engines are used in another dimension to keep revising sets of redundant data bits for successive lines of original data bits, where the redundant data bits become final when a last line of original data bits is accessed.

20 Claims, 11 Drawing Sheets

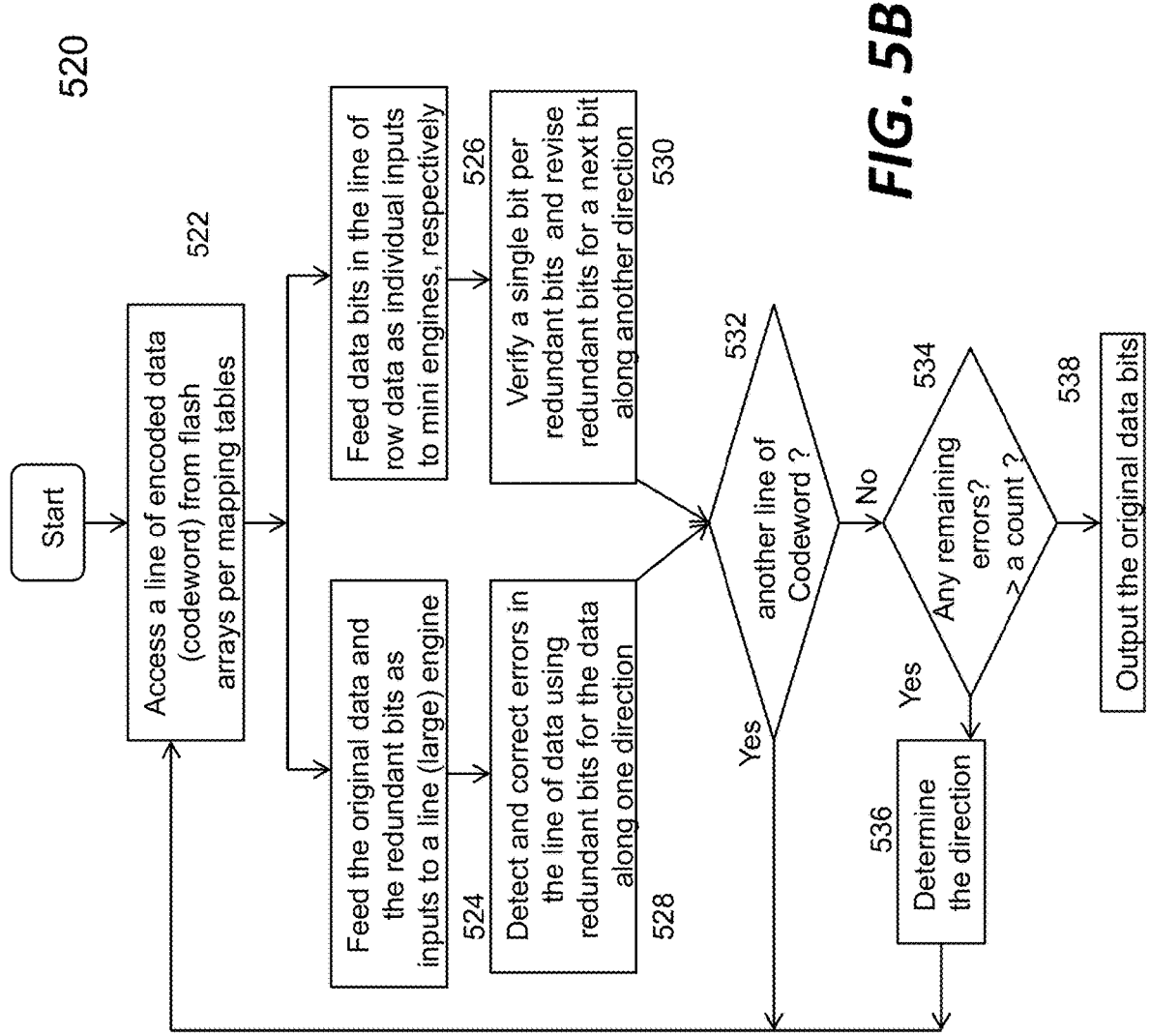

IMPLEMENTATION OF KEEPING DATA INTEGRITY IN MULTIPLE DIMENSIONS

BACKGROUND OF THE INVENTION

Field of Invention

The invention generally is related to the area of data management for data storage and communication, and more particularly related to data integrity and error correction in data management, and implementation of keeping data integrity in multiple dimensions (e.g., vertically and horizontally).

Related Art

Various electronic data is being created every moment. Retaining or storing the data is increasingly demanded than ever. Various technologies and devices have been developed to store the data. Data storage often includes hardware components and recording media to retain the digital data. Examples of the recording media include punch cards, hard drive disks, floppy disks, magnetic tapes, optical discs and semiconductors. Among the semiconductor-based recording media, flash memory is a type of nonvolatile memory that can be electrically erased and reprogrammed and is being used in many applications. One common use of the flash memory is the solid state drives (SSD) that can hold enormous amounts of data in very small size, enabling various kinds of new applications for many industries as well as consumer uses.

One of the problems with the flash memory is the data errors that may be caused by memory wear, read disturb error, program disturb error, over-programming error, retention error and others. These errors are becoming increasingly concerned with the continued scaling of NAND flash technology and advancements in multi-level cell (MLC) technologies, especially with nanometer-regime process geometries. Error Correction Code or Error Correcting Code (ECC) is commonly used with NAND flash memory to detect and correct bit errors that may occur with the memory. However, the flash memory bit error rates increase with the number of program/erase cycles and the scaling of technology. Therefore there is a need to correct more errors using the ECC without allocating more spaces for error correction codes. Without adding additional costs or impacting operation performance, there is another need for a technique that can be easily used to support higher raw bit error rates and enhance the lifespan of NAND flash memory.

An ECC is an algorithm of encoding an original message with redundant information in the form of an ECC. The redundancy allows a receiver to detect a limited number of errors that may occur anywhere in the message, and often to correct these errors if the number of errors is within a limit. The correction limit or the number of errors an ECC can detect and correct depends on the underlying encoding scheme used. A common example is Hamming code. Among many Hamming codes, an exemplary Hamming (7, 4) code encodes four bits of data into seven bits by adding three parity bits. With a given capacity of flash memory arrays, the more parity bits are allocated, the less storage capacity the flash memory arrays may offer. Accordingly, there is still another need for techniques that can extend the correction limit without compromising the storage capacity of a store medium (e.g., flash memory arrays).

The performance of an ECC is crucial in real applications. In data communication or data management, the error detection and correspond speed is one of the important factors in an overall consideration of a product, a service or a system. Accordingly, there is still another need for implementing an ECC more efficiently and more effectively given an application.

SUMMARY OF THE INVENTION

This section is for the purpose of summarizing some aspects of the present invention and to briefly introduce some preferred embodiments. Simplifications or omissions in this section as well as in the abstract may be made to avoid obscuring the purpose of this section and the abstract. Such simplifications or omissions are not intended to limit the scope of the present invention.

The present invention generally pertains to implementation for error detection and correction in multiple dimensions. According to one aspect of the present invention, data to be stored or transmitted are first encoded with added data bits (redundant data) in accordance with a predefined ECC scheme along more than one dimensions (e.g., horizontally or vertically). When requested or accessed, the ECC-encoded data is error-detected and decoded successively in the respective dimensions. The multidimensional encoding or decoding procedures are implemented in hardware or a combination of software and hardware to achieve optimum performance.

According to another aspect of the present invention, a raw data set is organized or presented in an array of M×N, the horizontal and vertical encoding or decoding of the array are performed simultaneously to minimize the operation time.

According to still another aspect of the present invention, a single (large) engine is used for encoding or decoding data in one dimension while a linear array of (miniature or mini) engines are used for encoding or decoding data in another dimension.

According to still another aspect of the present invention, a single (large) engine generates a set of redundant data bits with all data bits in a set of data to be encoded while each of the mini engines keeps revising a set of redundant data bits with only one data bit in the same set of data. The set of redundant data bits is finalized when a data bit from a last set of data to be encoded is received in the mini engine.

According to still another aspect of the present invention, the same single engine and the array of mini engines are used for error detection and correction (decoding) when the encoded data is accessed.

According to yet another aspect of the present invention, when the same engines are used for decoding, horizontal decoding and/or the vertical decoding are iteratively applied to further minimize errors in the original data that may have been corrupted.

The present invention may be implemented as an apparatus, a method, and a part of system. Different implementations may yield different benefits, objects and advantages. In one embodiment, the present invention is a device to manage a data set, the device comprising: a first encoding engine, receiving successively lines of original data bits, computing a set of first redundant data bits for a line of original data bits in accordance with a first predefined error detection correction (ECC) scheme, wherein a number of the first redundant data bits is predefined per the ECC scheme and dictates how many errors are correctable in the line of original data bits. The device further comprises: a linear array of second encoding engines, each receiving a single data bit from the line of original data bits, computing a set of second redundant data bits for the single bit from the line of original data bits in accordance with a second predefined error detection correction (ECC) scheme, wherein a number of the second redundant data bits is predefined and dictates how many errors are correctable across the lines of original data bits, the second redundant data bits are revised with a corresponding data bit from a next line of the original data bits and finalized with a corresponding data bit from a last line of the original data bits.

In another embodiment, the present invention is a method for managing a data set, the method comprises: receiving successively lines of original data bits; computing a set of first redundant data bits for a line of original data bits in accordance with a first predefined error detection correction (ECC) scheme, wherein a number of the first redundant data bits is predefined per the ECC scheme and dictates how many errors are correctable in the line of original data bits; computing simultaneously an array of sets of second redundant data bits from the line of original data bit, each of the sets of second redundant data bits computed from a single bit from the line of original data bits in accordance with a second predefined error detection correction (ECC) scheme, wherein a number of the second redundant data bits in a set is predefined and dictates how many errors are correctable across all lines of original data bits; and revising respectively the sets of second redundant data bits with a corresponding data bit from a next line of the original data bits, wherein the sets of second redundant data bits are finalized with a last line of the original data bits.

There are many other objects, together with the foregoing attained in the exercise of the invention in the following description and resulting in the embodiment illustrated in the accompanying drawings.

BRIEF DESCRIPTION OF THE FIGURES

These and other features, aspects, and advantages of the present invention will be better understood with regard to the following description, appended claims, and accompanying drawings where:

FIG. 5B shows is a process or flowchart of decoding an encoded data set or an array of encoded data bits in two dimensions

DETAILED DESCRIPTION OF THE INVENTION

The detailed description of the invention is presented largely in terms of procedures, steps, logic blocks, processing, and other symbolic representations that directly or indirectly resemble the operations of communication or storage devices that may or may not be coupled to networks. These process descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

One of the important objects, advantages and benefits in the present invention is to improve the data integrity and the reliability of data in communication or memory cells, especially in NAND flash memory cells. Data has been corrupted when the output information does not match with the input information. During transmission or storage, digital signals suffer from noise and other sources that can introduce errors in the binary bits travelling from one point to another or accessed. That means a 0 bit may change to 1 or a 1 bit may change to 0. To detect and correct these errors, additional bits are added to the original data. The additional bits are called parity bits or redundant data bits. Depending on a specific ECC algorithm or scheme being used, these redundant data bits allow detection or correction of the errors. The original data bits along with the redundant data bits generated therefrom form a codeword. To facilitate the discussion of the present invention, examples of data for storage in flash memory are used. Those skilled in the art shall appreciate that the description herein can be equally applied in other examples, such as digital communication.

Figure 1:
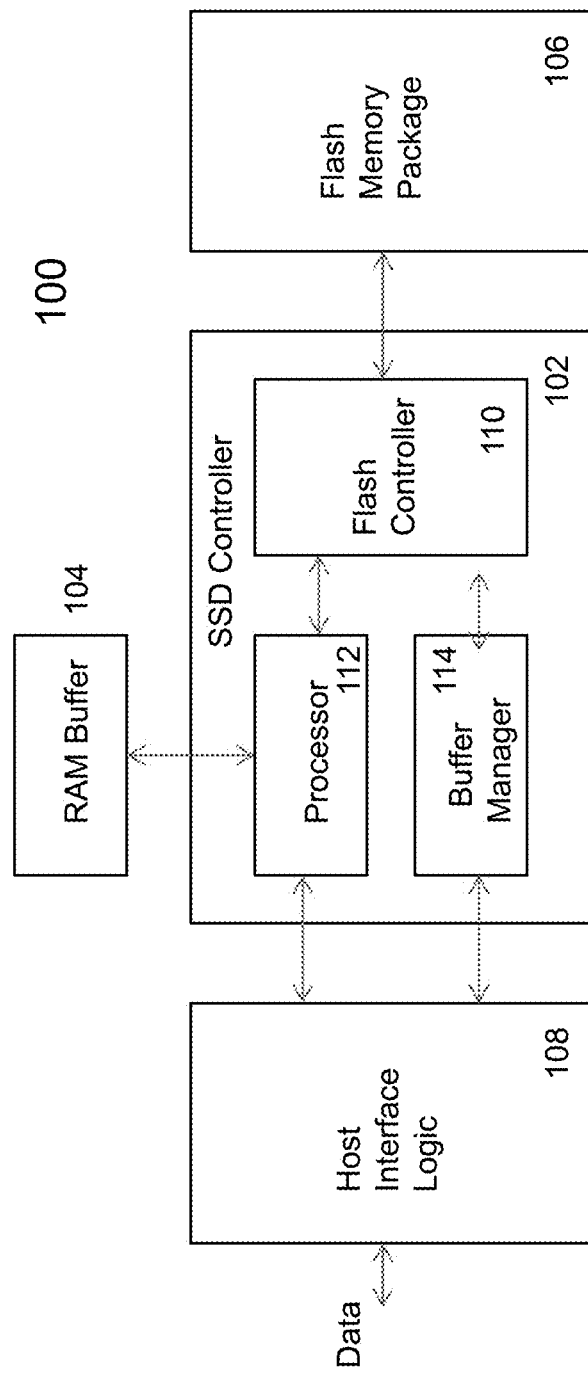
FIG. 1 shows an exemplary architecture of Solid State Device (SSD) that includes an SSD controller, a RAM buffer, a flash memory package and an interface.

FIG. 1 shows an exemplary architecture of Solid State Device (SSD) 100 that includes an SSD controller 102, a RAM buffer 104, a flash memory package 106 and an interface 108. The SSD controller 102 manages the data stored on flash memory package 106 and communicates with a host device. When a host system or device needs to read data from or write data into the SSD 100, it will communicate with the SSD controller 102. Through the interface 108 (e.g., eSATA, USB, eMMC, CF cards, SD/micro SD cards and PCIe), data from a host device (not shown) is coupled in, processed in the SSD controller 102 and stored in the recording media, namely the flash memory package or arrays 106. To keep track of how the data is organized on the media 106, various mapping tables are maintained by the SSD controller 102, where one or more of the mapping tables record where the data or data bits are stored in the flash memory arrays 106. In some high-performance SSD, the RAM buffer 104 is provided to increase the amount of mapping data immediately available and to cache data that has been written by the host device.

The SSD controller 102 is shown to include a flash controller 110, a processor 112 and a buffer manager 114. Under the processor 112, the controller 110 and the buffer manager 114 execute some firmware to manage where and how the data is stored exactly in the flash memory arrays 106, and from which the stored data can be selectively located and read out when a host needs some or all of the data.

One of the objectives, advantages and benefits in the present invention is the implementation of a predefined ECC scheme (encoding and decoding) in N dimensions, where N is greater than or equal to 2. In other words, a data segment can be viewed as an array of data bits, for example 213×292 or (213, 292). Before the data bits are stored into the flash memory, they are encoded with redundant data bits in accordance with a chosen ECC scheme row by row, and again column by column vertically or vice versa. When they are accessed from the flash memory, the encoded data bits that may have been corrupted are error detected and corrected before they are put into use or returned to a host requesting for them.

According to one embodiment of the present invention, a flash controller responsible for putting the data onto the flash memory can be programmed or controlled to perform a coordinating level of error detection and correction to accomplish the required dependability and reliability. Those skilled in the art can appreciate other hardware devices (e.g., microcontroller) may implement the same given the detailed description herein.

It is known in the art that error correcting code (ECC) is an encoding scheme that transmits data in binary numbers in such a way that the data can be recovered even if some bits are erroneously flipped. Various ECC methods are used in practically all cases of data transmission, especially in data storage where ECCs defend against data corruption. In implementation, ECC is an algorithm for expressing a sequence of extra numbers to be embedded in or appended to a sequence of data bits such that a limited number of the data bits unexpectedly flipped (e.g., from "0" to "1" or "1" to "0") can be detected and corrected based on the extra numbers. When data is stored in nonvolatile memory, it is crucial to have the mechanism that can detect and correct a certain number of errors.

Error correction code (ECC) can encode k data bits to become a block of n bits called a codeword. A block code (linear or not) works efficiently with a fixed data length, takes k data bits and computes m parity bits, where m=n−k. In general, the larger m is, the more errors the ECC may be able to correct. To maximize the data storage capacity in a given flash memory array, the length m is designed practically limited.

Figure 2:
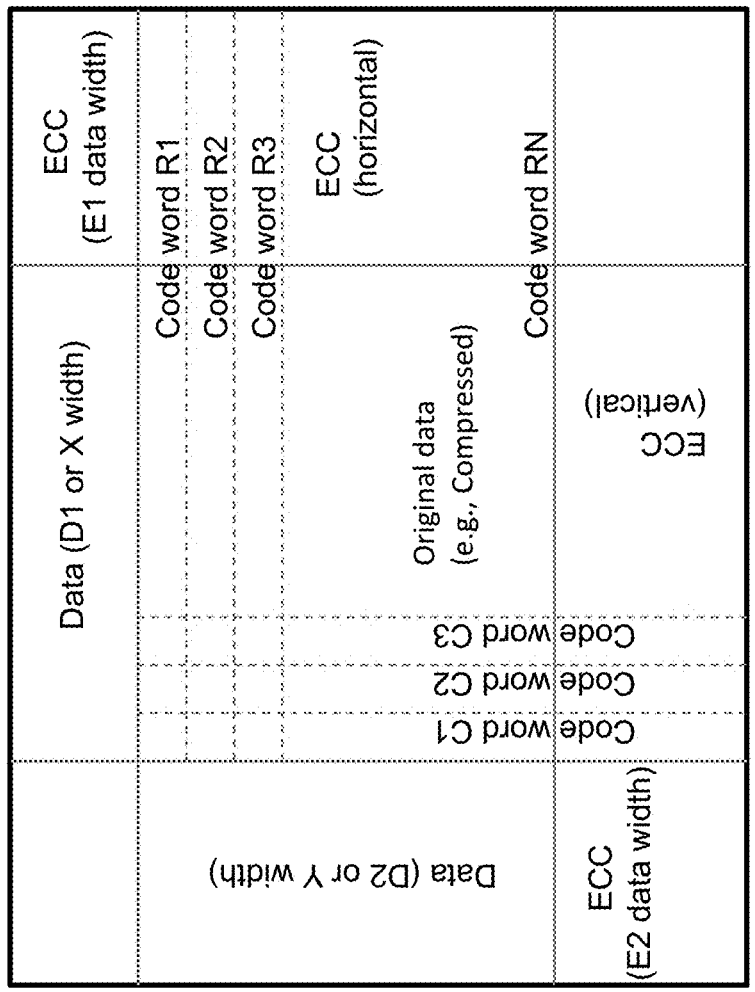
FIG. 2 shows an example of applying the ECC in two dimensions or horizontal and vertical directions.

According to one embodiment, at a point when the data is written to flash memory arrays, the predefined ECC is registered and stored together with the data (original, pre-processed or compressed), resulting in ECC encoded data or code words. At the point when the encoded data is read back, the ECC is recomputed and analyzed against that already stored on the flash memory arrays to recover the data. FIG. 2 shows an example of applying the ECC in two dimensions or horizontal and vertical directions. Different from the traditional use of ECC that is simply applied to a sequence of data bits once, the ECC is applied across the data horizontally first and then vertically, or vice versa, according to one embodiment. In operation, the original data along the horizontal direction is encoded first with a predefined ECC scheme, resulting rows of codewords (original data+ECC codes or other bits), R1, R2, . . . RN.

According to one embodiment, an ECC scheme based on Hamming code is used. Hamming code is a set of error-correction codes that can be used to detect and correct the errors that are introduced to the encoded data. For example, if the number of data bits is 7, then the number of redundant bits is 4, satisfying $2^r \geq m+r+1$, where r=redundant bit and m=data bit. After the data bits are encoded with the redundant bits, the code word is 11 bits in length. According to another embodiment, an ECC scheme based on BCH coding is used. BCH stands for Bose-Chaudhuri-Hocquenghem codes that forms a class of cyclic error-correcting codes constructed using polynomials over a finite field (also called Galois field). Those skilled in the art may appreciate that other ECC codes or schemes may be used in the way the implementation is described hereinafter.

FIG. 2 shows that, in each row, data bits are D1 bits or X in length and E1 bits for the parity or redundant bits. Those skilled in the art can appreciate that these E1 redundant bits are often encoded within the D1 data bits even though there are collectively and graphically shown at the end of the data bits. There are now N rows of code words or codewords. A predefined ECC scheme is applied vertically. Although the ECC scheme applied vertically does not have to be the one that has been applied horizontally, it is assumed herein that the ECC applied is the same vertically or horizontally. One difference is that the data bits along the vertical direction ($2^{nd}$ dimension) are not from the same data bits in a row. These data bits are from each of the rows of the original data or codewords, and encoded with a set of redundant bits per the ECC scheme. Those skilled in the art shall understand that the operation as described above may be applied vertically first then horizontally.

FIG. 2 also shows another way of encoding the original data bits with ECC according to one embodiment of the present invention. In operation, a predefined ECC operation is applied to horizontal and vertical data bits simultaneously or one after another. In the case that the redundant bits are embedded in the original data bits, they can be addressed to the end of a line of original data bits to ensure that the original data bits get encoded completely with the ECC in another dimension.

Figure 3A:
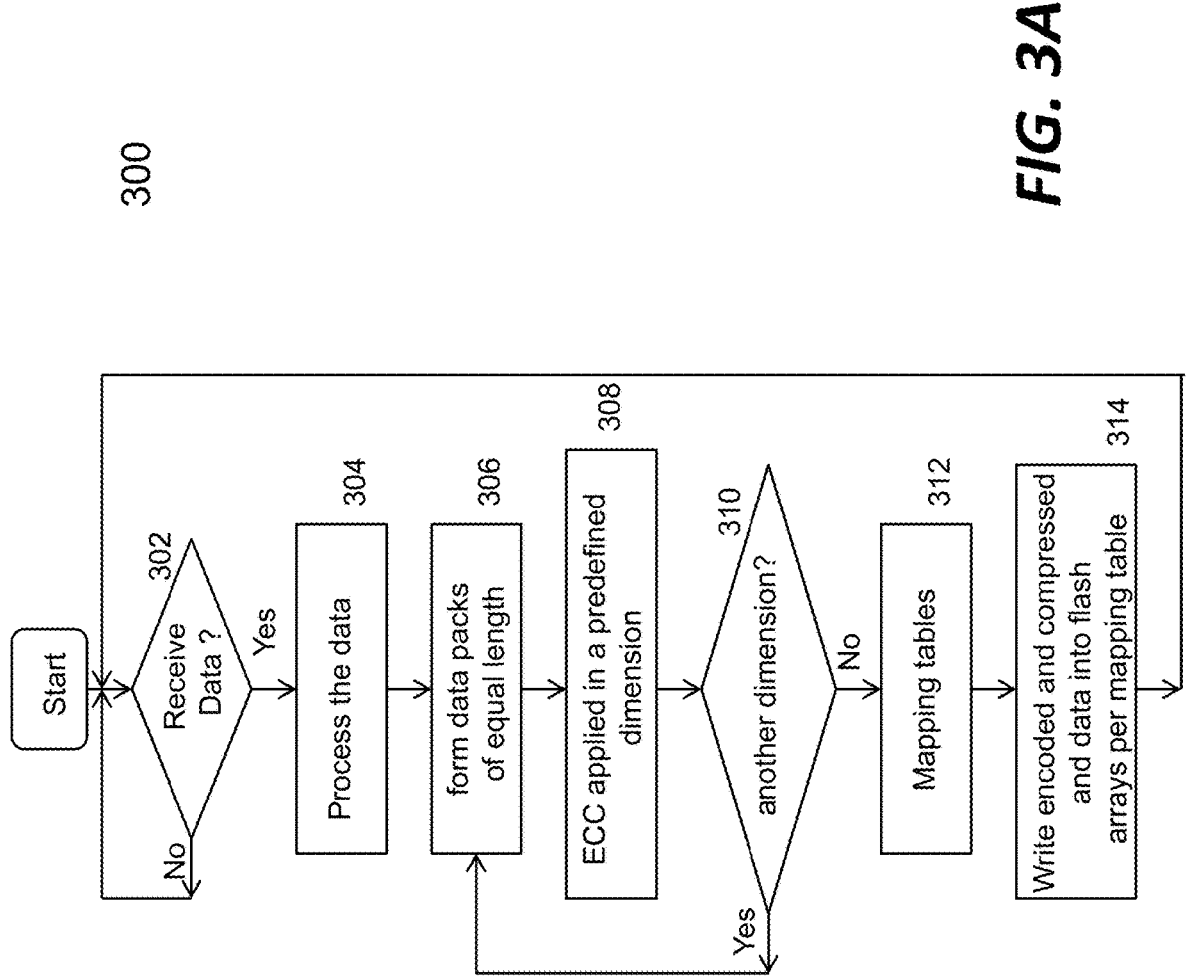
FIG. 3A shows a flowchart or process of writing a data stream or data set into a flash memory array according to one embodiment of the present invention.

FIG. 3A shows a flowchart or process 300 of writing a data stream into a flash memory array according to one embodiment of the present invention. The flowchart 300 may be implemented in hardware or in combination of software (e.g., firmware) and hardware. The flowchart 300 starts when a data stream is received or coupled in at 302. The data stream may be pertaining to a file, a photo and an audio/video from a host device (e.g., a laptop computer). When a user desires to store a file into a storage device (e.g., SSD), the data stream is received.

At 304, the data stream may be initially preprocessed, for example, compressed in accordance with a compression scheme. At 306, data packs for the processed data are formed in accordance with a chosen ECC (e.g., Hamming code or BCH code). As used herein, a data pack is a serial of bits in a fixed length, one example of the fixed length is that that data bits just fit into a portion or a page in a flash memory while a block is a serial of bits that just fits into a block in a flash memory. It should be noted that a block is the smallest unit in a flash memory that can be erased while a page is the smallest unit in the flash memory that can be programmed (i.e. written therein). The common block size is typically in a range of 4-8 MB in size and the common page size is typically in a range of 8-16 KB in size. The architecture of NAND flash memories dictate that data is written or read in pages, typically between 4 KiB and 16 KiB in size, but can only be erased at the level of entire blocks consisting of multiple pages and MB in size. To facilitate the description of the present invention, a (data) page herein is often graphically presented as a series of cells along a direction, such as a horizontal (data) page or a vertical (data) page, to indicate that the memory cells in a page, even they might be physically in multiple lines, are all used to store a data pack along one dimension.

At 308, the predefined ECC is applied to the formed data pack. In operation, the encoded data bits, any padded bits if needed (with known values) and the redundant bits from the ECC are written into the flash memory. At 310, the process 300 goes back to 306, where the data packs along another dimension formed. In one embodiment, the dimension is 2, namely horizontal and vertical. Should the first pass be for the horizontal dimension, the second ECC is now applied vertically. The data packs are formed as described above across all data packs formed in the first pass. With the reserved spaces for the redundant bits from the ECC, additional padded bits with known values are added to fill up the page to be written in the flash memory.

Referring now back to FIG. 3A, the codewords are stored in the allocated spaces shown in FIG. 2 and managed by one or more mapping tables. At 312, the mapping tables are concurrently generated or updated to record where the data bits of the data are stored in the flash memory arrays. Once the data is encoded horizontally and vertically, the process 300 goes on 314 to finish writing the data into the flash memory arrays.

Figure 3B:
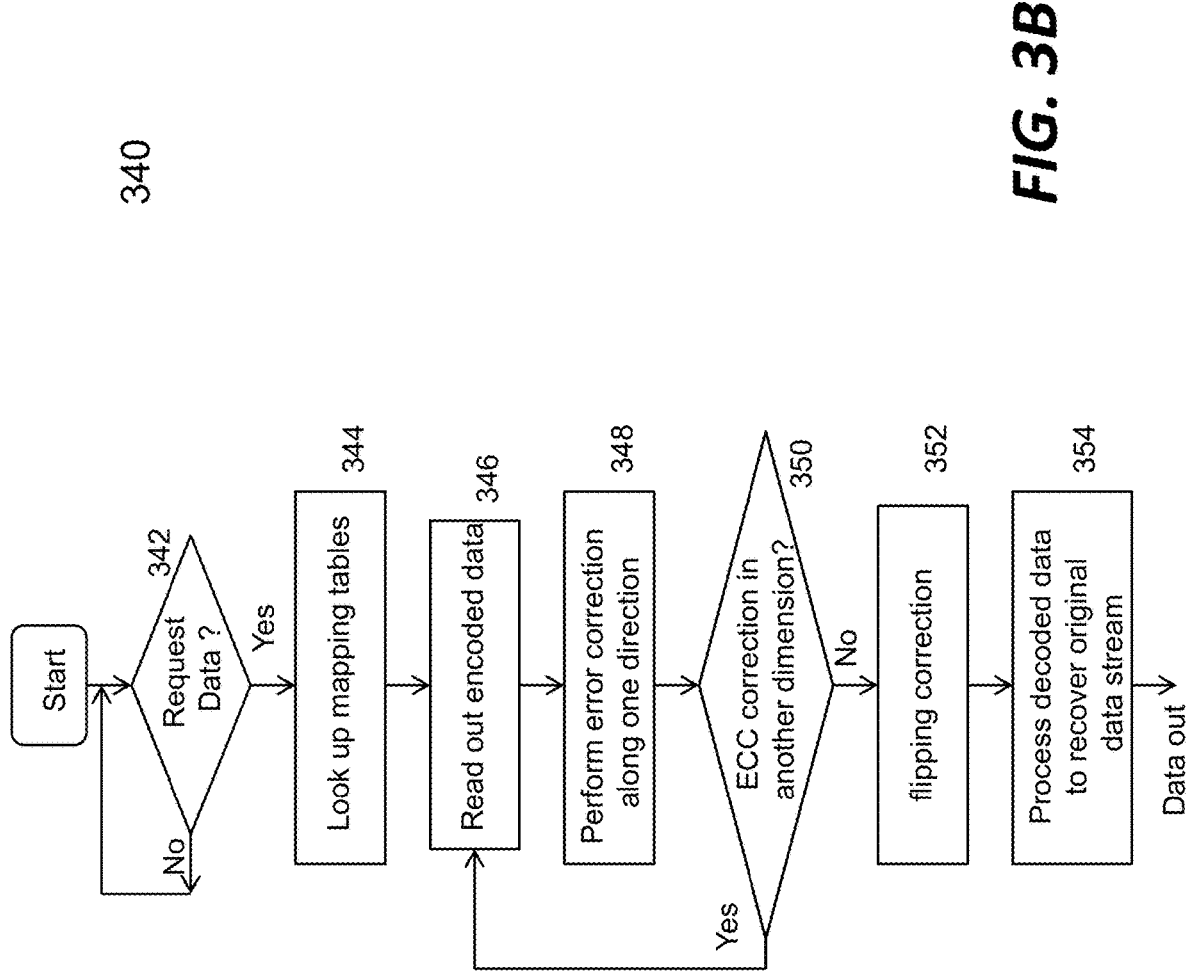
FIG. 3B shows a flowchart or process of detecting and correcting errors in stored data according to one embodiment of the present invention.

FIG. 3B shows a flowchart or process 340 of detecting and correcting errors in stored data according to one embodiment of the present invention. The flowchart 340 may be better appreciated in view of FIG. 2 and FIG. 3A, and implemented in hardware or in combination of software (e.g., firmware) and hardware. The flowchart 340 starts when there is a data request from a host device (e.g., a media player) for a file, data of which is stored in a flash memory array. Upon receiving the request, a flash controller checks with the mapping tables that may be stored in a separate memory (e.g., RAM) or the flash memory array. Given the mapping tables, the data for the requested file is located in the flash memory array and bits of the data are read out for error detection and correction first before they are sent out or become available to the host device.

The mapping tables are provided to facilitate the translation of a logical address from a file system to a physical address of flash memory. The mapping tables are created or updated when a file is written or saved in the flash memory. At 344, the stored mapping tables are accessed, from which data bits pertaining to the requested file are read out at 346. However, some of the stored data bits may have been corrupted in reality, for example "1" to "0" or "0" to "1".

At 348, these data bits are checked per the registered ECC to see if there are any errors. If there are some, depending on the number of errors, they can be readily corrected or corrected with extra effort including to repeat the error detection and correction process 348. If the number of errors exceeds a threshold (correction limit) per the ECC, the errors cannot be corrected and an error would be reported. At 350, these data bits are checked again per the registered ECC in another dimension to see if there are any errors. If there are some, depending on the number of errors, they can be readily corrected or corrected with extra effort. One of the important objects, advantages and benefits in the present invention, an efficient implementation of the ECC is important in carrying out the error detection and correction in multiple dimensions.

At 352, the process 340 performs the error flipping correction. This process is only needed when there are errors that could not be corrected through the process 346-350. It shall be understood that the process 340 comes to 352 only when the ECC has been applied respectively along one or more dimensions, and possibly repeatedly. Assuming all errors are corrected, the process 340 goes to 354 to recover the original data. To facilitate the understanding how errors are detected and corrected through 346-350 in one embodiment of the present invention, FIG. 4A-FIG. 5B are provided to show exemplary implementations of the encoding and decoding processes in two dimensions according to one embodiment of the present invention.

Figure 4A:
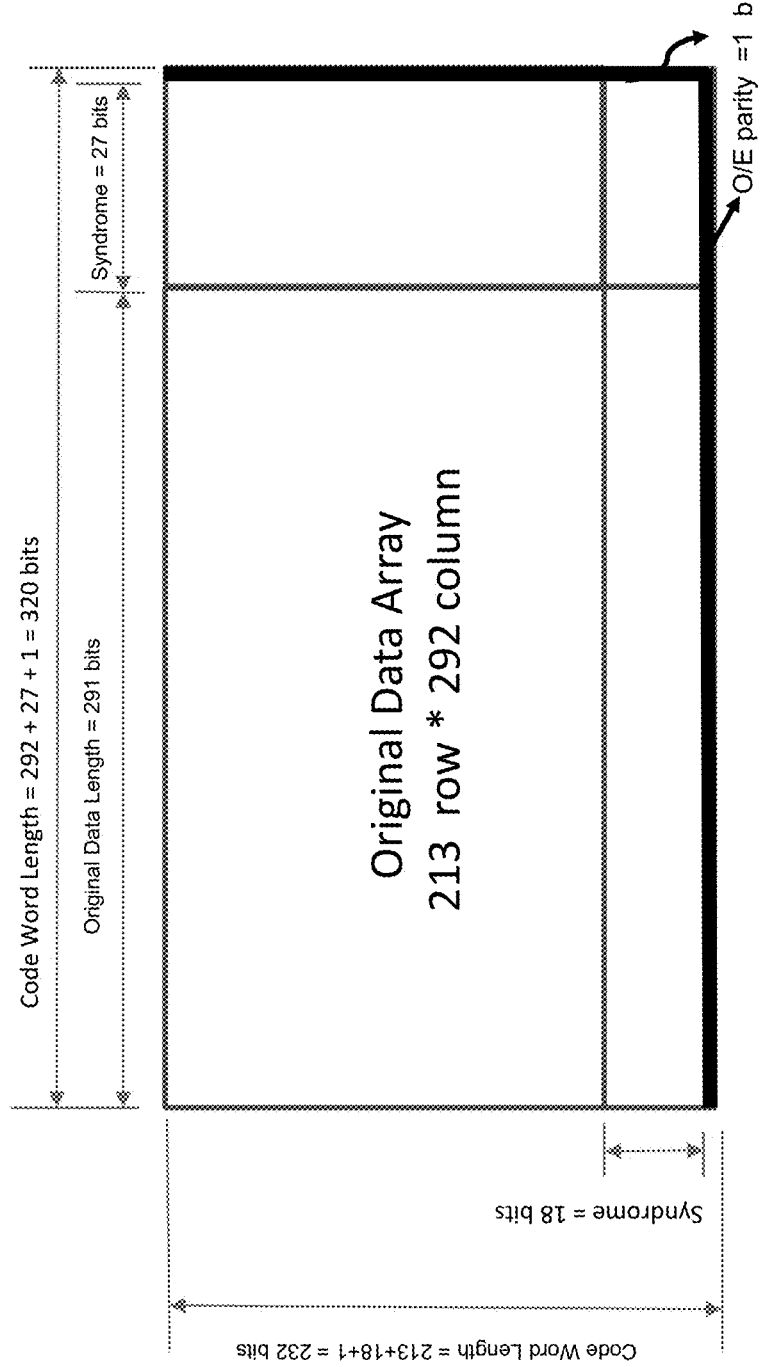
FIG. 4A, it shows a graphical example of codewords in two dimensions according to one embodiment of the present invention.

Referring now to FIG. 4A, it shows a graphical example 400 of codewords in two dimensions according to one embodiment. These codewords are the result of an original data array 292×213 encoded with a chosen ECC in two dimensions. As the data map 400 shows, there are 28 redundant data bits in addition to the original data bits 293, resulting in horizontal codewords in 320 data bits long, and there are 19 redundant data bits in addition to the original data bits 213, resulting in vertical codewords in 232 data bits long. It is assumed in this particular example that up to 3 errors in a row of the original data bits can be detected and corrected while up to 2 errors in a column of the original data bits can be detected and corrected. Understandably, more redundant data bits may be used to increase the capacity of correcting more errors, in needed.

Figure 4B:
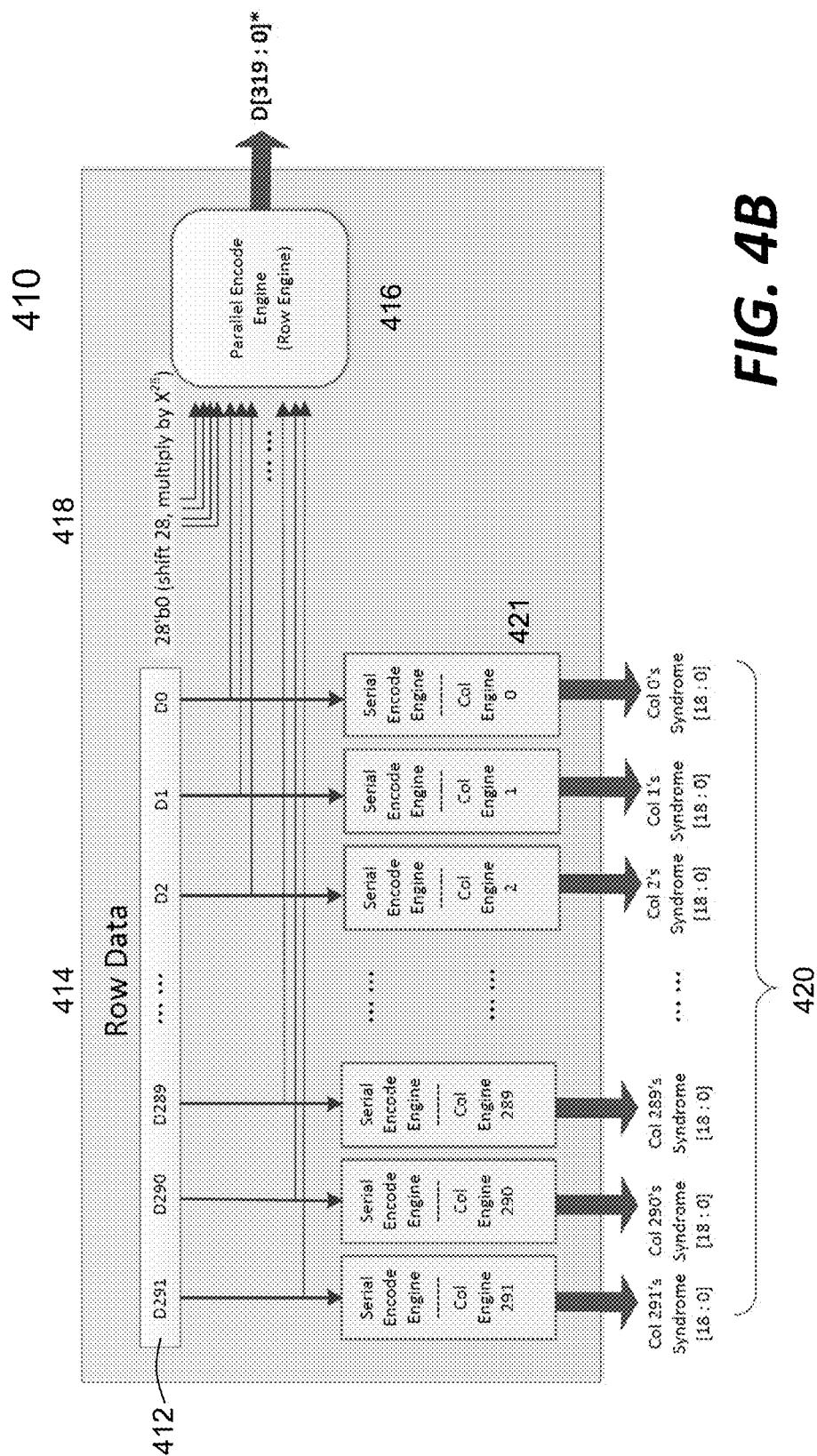
FIG. 4B shows a functional block diagram of implementing encoding of a data stream in two dimensions by one or two respective predefined ECC schemes.

FIG. 4B shows a functional block diagram 410 of implementing encoding of a data stream in two dimensions by one or two respective predefined ECC schemes. In one embodiment, there is an array of registers or simply memory cell 412 provided to accommodate a row of original data bits 414 that may have been accessed from the RAM 104 of FIG. 1. In reference to FIG. 4A, FIG. 4B shows that there is a row or line of 292 data bits read into the memory cells 412 at a clock (CLK). As used herein, a CLK is defined as a time unit to trigger an event. Depending on implementation, a CLK may be formed with one or more clock signals (e.g., pulses) lasting a duration (e.g., 0.1 or 10 milliseconds).

The data bits from the memory cells 412 are provided to an encoding engine 416, referred to herein as Parallel Encoding Engine or PEE. The PEE 416 is implemented in accordance with a predefined ECC scheme. In one embodiment, this PEE 416 is designed to accept all of the 292 original data bits to calculate or determine the values of the 28 redundant data bits 418. In other words, the PEE 416 is provided with a set of (28) redundant data bits initially set to be 0 and determines the eventual values of these redundant data bits with the input of the original data (292 data bits) in accordance with a predefined ECC scheme.

Figure 4C:
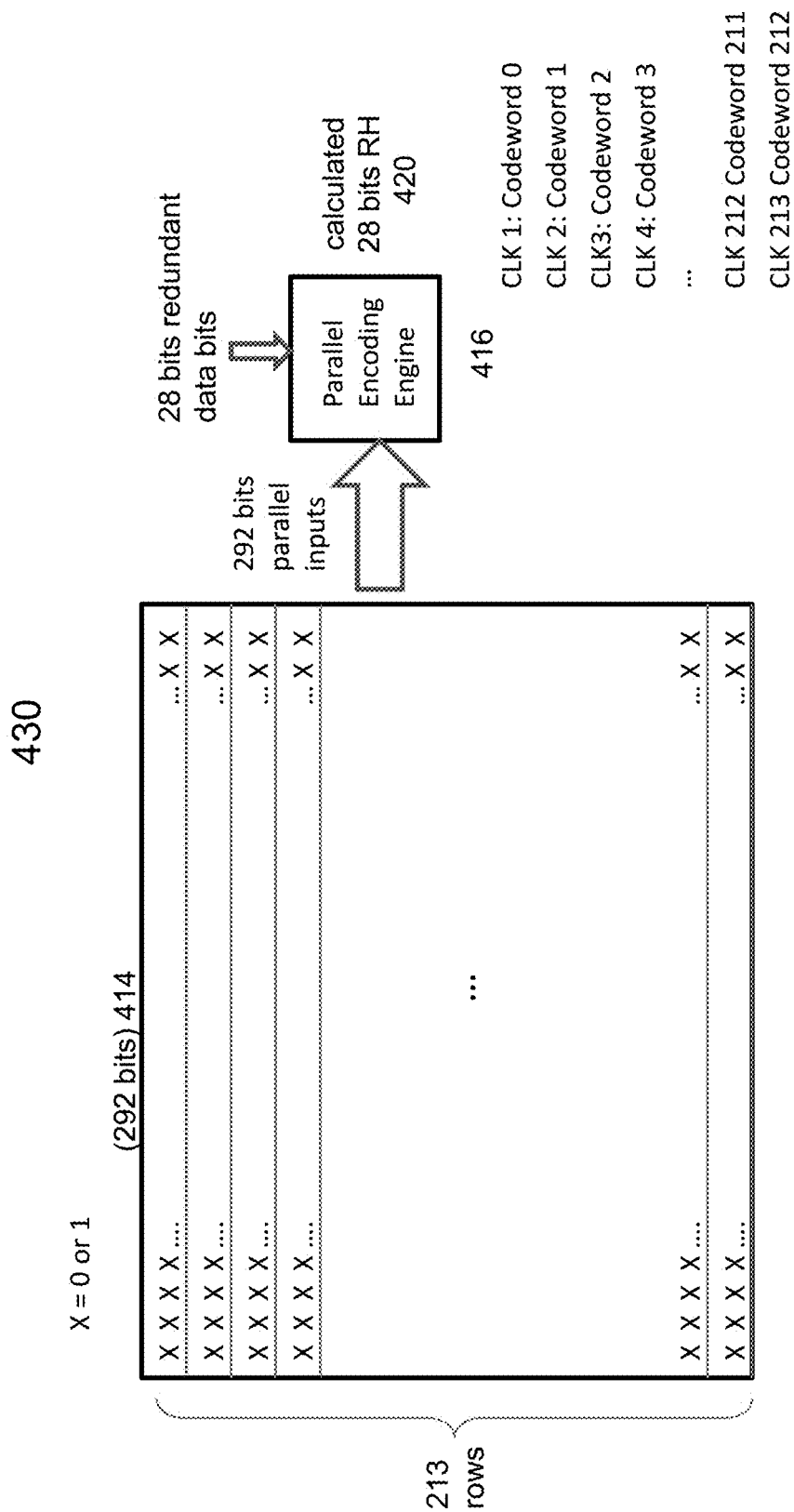
FIG. 4C shows how the redundant data bits or each of the horizontal codewords (CW) is created.

To facilitate the understanding of FIG. 4B, FIG. 4C shows how the redundant data bits or each of the horizontal codewords (CW) is created. According to one embodiment, there need essentially 213 CLKs to read out or access all rows of the original data bits. For each row of the original data, the PEE 416 generates a set of redundant data bits RH 420, where R stands for the redundant data bits and H indicates for horizontal data. At the end of 213 CLKs, there are 213 sets of redundant data bits RH 420 for the 213 rows of the original data, resulting in 213 codewords (encoded data) with integrated with the original data bits as shown in FIG. 4A.

Referring now back to FIG. 4B, the same row of data is provided to an encoding engines 420, each referred to herein as Serial Encoding Engine or SEE. The SEE is implemented in accordance with a predefined ECC scheme. In one embodiment, a single SEE 421 is designed to accept only one single data bit to calculate or determine the values of the 19 redundant data bits. In other words, the SEE is provided with a set of (19) redundant data bits initially set to be 0 and determines the eventual values of these redundant data bits with the input of a single original data bit across all of the rows of data bits. As a comparison, the Parallel Encoding Engine or PEE involves much more calculations than that of the Serial Encoding Engine or SEE. Accordingly, the PEE is herein referred to as a large encoding/decoding engine or simply a large engine while SEE is referred to as a mini encoding/decoding engine or simply a mini engine.

Depending on the underlying encoding or decoding algorithm, the structure of the PSS or the SEE for each algorithm is different. Many of the encoding or decoding algorithms are well known. For examples, IJERT has a publication entitle "Implementing (7, 4) Hamming Code Encoding and Decoding System Using CPLD", Volume 02, Issue 07 (JULY 2013) describes an exemplary implementation of ECC using Hamming codes, and "Implementation of BCH Code (n, k) Encoder and Decoder for Multiple Error Correction Control" by Yathiraj H U et al, International Journal of Computer Science and Mobile Applications, Vol. 2 Issue. 5, May-2014, pg. 45-54 describes another exemplary implementation of ECC using BCH codes, all of which are hereby incorporated by reference. Accordingly, the detail of each engine, either the PSS or the SEE, will not be further described herein to avoid obscuring aspects of the present invention.

Figure 4D:
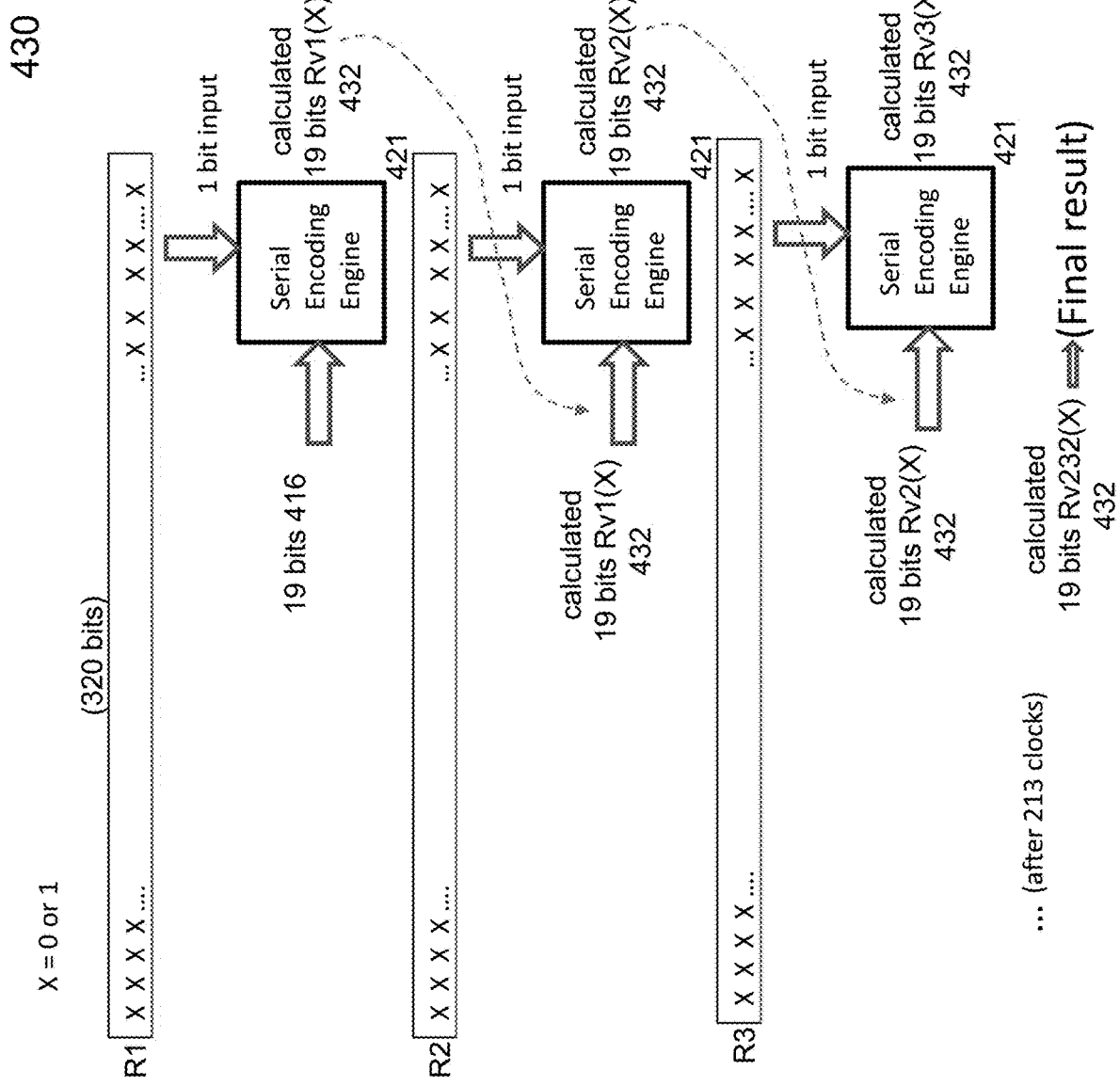
FIG. 4D shows how the intermediary redundant data bits or each of the vertical codewords (CW) is created.

To facilitate the understanding of vertical encoding shown in FIG. 4B, FIG. 4D shows how each of the vertical codewords (CW) is created. As described above, there need essentially 213 CLKs to read out or access each of rows of the original data. While one raw of the original data is being encoded in the PEE 416, the same raw of the original data can be also used for the vertical encoding. From the hardware perspective, the requirement on the bandwidth of data bus is reduced. For example, a first line of original data R1 is read out from a memory device such as SRAM for horizontal encoding as shown in FIG. 4C, R1 is used at the same time to initiate the vertical encoding. Different from the PEE 416 that takes in all of the data bits in the row as the inputs to compute the redundant data bits for the row of original data, the SEE 421 takes only one data bit from R1. As shown in FIG. 4B, there are now 292 data bits, there are 292 PEEs, each responsible for one of the data bits.

For simplicity, FIG. 4D shows only one SEE 421 that takes a single data bit from R1 to compute the (19) redundant data bits. Initially these redundant data bits are all set to be 0. With the single data bit from R1, the SEE 421 computes the (19) redundant bits. The calculated redundant bits 432, intermediary results, are used again to be refined or computed when a next data bit from R2 is inputted to the SEE 421. In other words, after CLK2, two sets of the redundant bits for the first two rows of original data are obtained once and for all while an array of twice revised redundant data bits (from all Os) are obtained only as intermediary values. At another CLK, R3 data bits become available, the twice revised redundant data bits 432 are now revised again with a corresponding data bit in R3. When the last row of original data R213 becomes available, the intermediary results from R212 are revised again with a corresponding data bit in R213, the outputs from the SEE 421 are now the final results. As a result, the vertical encoding of the original data is completed at the same time as the horizontal encoding of the original data is completed.

The time to complete the horizontal and vertical encoding shall be around or at 213 CLKs.

Figure 4E:
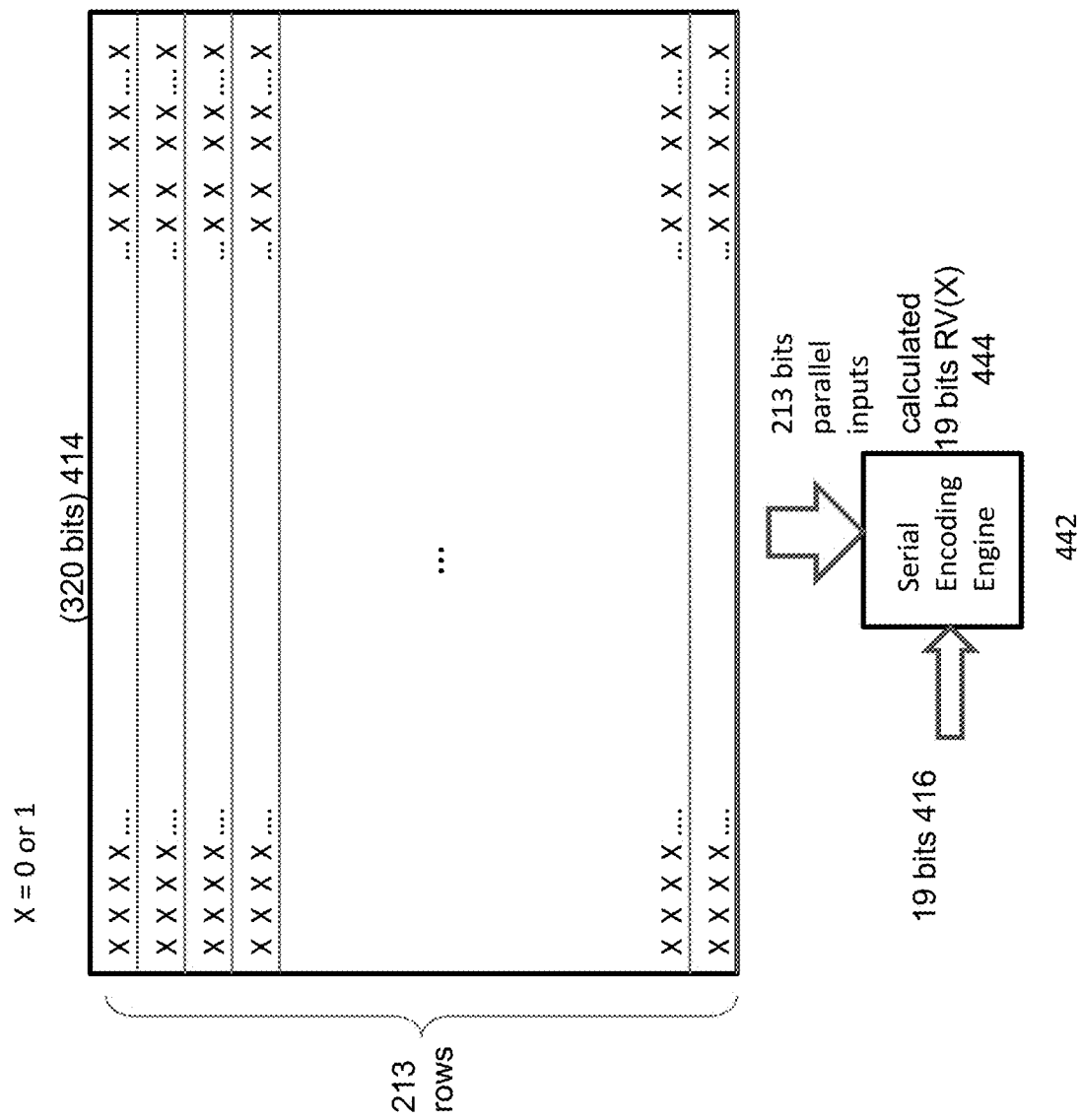
FIG. 4E shows, as a comparison, using a single serial encoding engine to provide total encoding along the vertical dimension.

As a comparison, FIG. 4E shows using a single SEE 442 to provide encoding along the vertical dimension. Similar to the PEE 416, the SEE 442 takes all of the data bits across the rows of the original data bits and to computer the redundant bits once and for all. As described above regarding the operation of PEE 416, the SEE 442 needs to generate a set of the redundant bits for each column of data bits. It can be seen it would take 320 CLKs to finish the access of each of the columns. Although there is only one SEE 442 in use, the total time of encoding the array of data (213, 292) would require at least 213+320 CLKs. In addition, the implementation of the SEE 442 itself is much more complicated than that of the SEE 421, where the SEE 442 needs to deal with 213 data bits as its inputs while the SEE 421 needs to deal with only one data bit at a time.

Figure 5A:
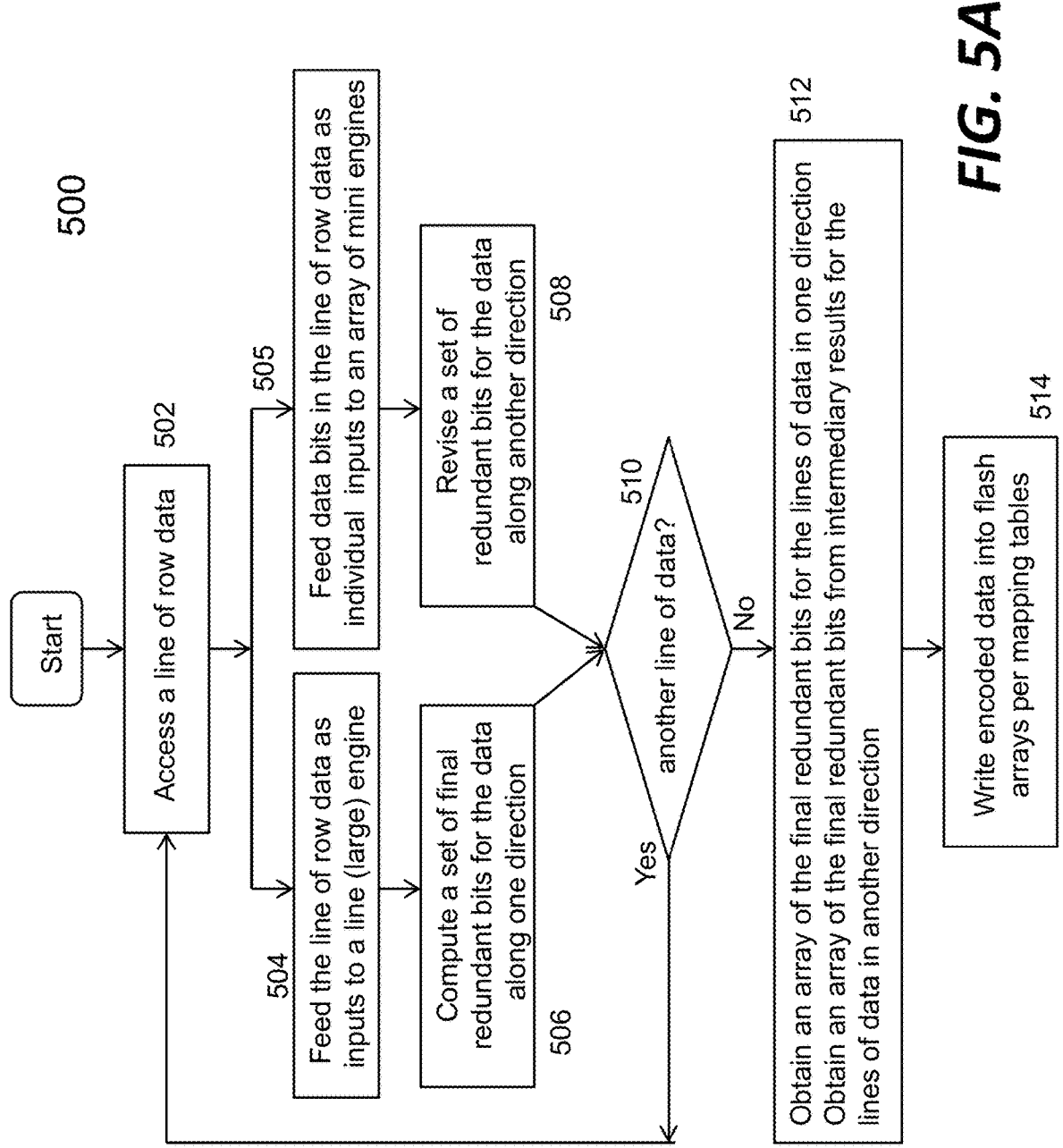
FIG. 5A shows a process or flowchart of encoding a data set or an array of data bits in two dimensions.

Referring now to FIG. 5A, there is a process or flowchart 500 of encoding a data set or an array of data bits in two dimensions. The process 500 may be better understood in reference to FIGS. 4A-4E, and implemented as shown in FIGS. 4A-4E or in software in conjunction with hardware.

The process 500 starts when a sender (e.g., a host device) transmits or transports a file over a communication channel to a receiver implementing one embodiment of the present invention (e.g., another device or simply a storage device). A data set representing some or all of the file is viewed as an array (M, N), where M or N is an integer. In one embodiment, the values of M and N are closely related to the page size defined in a flash memory when the data set is meant for storage in the flash memory.

At 502, the data set is accessed row by row. Whenever a row of data becomes available in memory cells or registers, two encoding processes 504 and 505, each along one direction, take place simultaneously. The encoding process 504 encodes all data bits in the row of data via a single parallel encoding engine and computes all redundant data bits, once for all, needed to correct a predefined number of errors in the data bits. In one embodiment, the parallel encoding engine takes in all data bits in the row of data as its first inputs and a predefined number m1 of redundant data bits as its second inputs. Initially, the m1 redundant data bits are all set to be a known number, such as 0 or 1. The parallel encoding engine computes or revises the redundant data bits using the first inputs in accordance with a predefined ECC or encoding scheme at 506. The output of the parallel encoding engine is the final redundant data bits, hence a codeword is formed.

The encoding process 506 encodes each of the data bits in the row of data, respectively via an array of (N+m1) serial encoding engines. In other words, each of the serial encoding engines encodes only one data bit from the row of data. In operation, a serial encoding engine takes one bit from the row of data as its first input and a predefined number m2 of redundant data bits as its second inputs. The serial encoding engine computes or revises the redundant data bits using the first input in accordance with a predefined ECC or encoding scheme at 508. The output of the serial encoding engine is the redundant data bits for the single bit, or intermediary results as the encoding along column direction has not finished yet.

As the original data are read out row by row at 510, the encoding process 504 produces M sets of redundant data bits for the M rows of original data bits while the encoding process 506 keeps revising the N or N+m1 sets of redundant data bits till the last row of original data bits become available.

At 510, it is determined all of the data set have been encoded. The process 500 now moves to 512. The M sets of these m1 redundant data bits from the encoding process 504 (i.e., a parallel encoding engine) are the ones for the respective M rows of original data bits, thus leading to M row or horizontal codewords. All of the outputs from the encoding process 506, namely N serial encoding engines, are now finalized. Each of the outputs has m2 redundant data bits derived from a column of the original data, thus leading to N column or vertical codewords. At 514, the array of the original data bits along with the horizontal and vertical codewords are saved or written into one or more flash memories per mapping tables.

Referring now to FIG. 5B, there is a process or flowchart 520 of decoding an encoded data set or an array of encoded data bits in two dimensions. The process 520 is largely an opposite process of FIG. 5A and may be better understood in reference to FIGS. 4A-5A. An exemplary implementation corresponding to FIGS. 4A-4E is not detailed. Those skilled in the art shall understand that such an implementation is substantially similar to that shown in FIGS. 4A-4E, except the computations for the decoding are just opposite. FIG. 5B may be implemented in software in conjunction with hardware.

The process 520 starts when a host device requests a file stored in flash memory. In the case of digital communication, the receiver starts to access the received data sent from the sender, where the received data was encoded before it was sent out. It is now assumed that the stored data or the received data has been encoded per FIG. 5A. Thus the data set is an array of (M+m2, N+m1), where the arrays (M, m1) and (m2, N) are the redundant data bits from the horizontal and vertical encodings. Similar to 502, a row of codeword is accessed or read out at 522, where the codeword includes an array of M original data bits and m1 redundant data bits. Some of the M original data bits may have been corrupted. A detection and correction (a.k.a., decoding) process is to detect any errors and correct them if the number of errors is under a predefined number that dictates how many redundant data bits have been used when the original data is encoded.

In view of the encoding process at 504 of FIG. 5A, the decoding process at 524 operates reversely, namely the same engine, now referred to as decoding engine, receives all data bits in the original data and the corresponding redundant data bits. With the redundant data bits, the decoding engine checks at 528 if any of the data bits in the original data have been flipped and correct the errors if the errors are in a small number according to an inherently registered encoding scheme used to produce the redundant data bits per the original data.

At the same time, the decoding process at 526 operates reversely in view of 505 of FIG. 5A, namely the same array of engines, now referred to as decoding engines, each uses a single data bit in the original data and the corresponding redundant data bits. With the redundant data bits, the decoding engine checks if this particular data bit has been flipped and correct the error if it is according to an inherently registered encoding scheme used to produce the redundant data bits per the original data bit at 530.

At 532, the process 520 checks if there are any remaining codewords. If yes, the process 520 goes back to 522 to access another codeword. If not, the process 520 moves to 534, where it determines if there are any errors in the original data set that could not be corrected because the number of errors in the codeword exceeds the number of errors the redundant data bits could be used to correct. According to one embodiment, the steps 522-532 can be repeated if needed, but the number of the repeats must be under a threshold.

It should be noted that either one or both of the decoding processes 524 and 526 may be repeated depending on the number of errors measured across a row or column of data. In other words, after first decoding horizontally and vertically (or vice versa), the decoding process can be applied again along the row or column as the corrected errors would be used to facilitate the correction of other errors.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claim. Accordingly, the scope of the present invention is defined by the appended claims rather than the forgoing description of embodiments.

We claim:

1. A device to manage a data set, the device comprising:
    a first encoding engine, receiving successively lines of original data bits, computing a set of first redundant data bits for a line of original data bits in accordance with a first predefined error detection correction (ECC) scheme, wherein a number of the first redundant data bits is predefined per the ECC scheme and dictates how many errors are correctable in the line of original data bits; and
    a linear array of second encoding engines, each receiving a single data bit from the line of original data bits, computing a set of second redundant data bits for the single bit from the line of original data bits in accordance with a second predefined error detection correction (ECC) scheme, wherein a number of the second redundant data bits is predefined and dictates how many errors are correctable across the lines of original data bits, the second redundant data bits are revised with a corresponding data bit from a next line of the original data bits and finalized with a corresponding data bit from a last line of the original data bits.

2. The device as recited in claim 1, wherein the line of original data bits are all provided to the first encoding engine as first inputs thereto, the first redundant data bits are all provided to the first encoding engine as second inputs thereto, all values of the first redundant data bits are set to a known value.

3. The device as recited in claim 2, wherein the first encoding engine outputs finalized first redundant data bits, a codeword of the line of original data bits includes the finalized first redundant data bits.

4. The device as recited in claim 3, wherein each of the original data bits in the line is provided to one of the second encoding engines as a first input, the second redundant data bits are all provided to the one of the second encoding engines as second inputs thereto, all values of the second redundant data bits are set to a known value.

5. The device as recited in claim 4, wherein the second encoding engines output collectively an array of intermediary second redundant data bits for the line of original data bits.

6. The device as recited in claim 5, wherein the array of intermediary second redundant data bits are finalized after the last line of the original data bits is accessed.

7. The device as recited in claim 6, further comprising:
    an array of flash memory;

a memory space for storing firmware;

a processor coupled to the memory space and executing the firmware to perform operations of:

forming a data set into original data bits in rows and columns, wherein the data set pertains to a file to be written into the flash memory;

causing the first encoding engine to produce the first redundant data bits for each of the rows; and causing the second encoding engines to produce the second redundant data bits for each of the columns;

updating a mapping table to record where the data bits and the redundant bits are physically stored in the flash memory array.

8. The device as recited in claim 6, wherein the first encoding engine becomes a first decoding engine when the finalized first redundant data bits are provided to the first encoding engine as the second inputs, and the first decoding engine detects and corrects with the finalized first redundant data bits a limited number of errors in the line of original data bits being read from a storage medium.

9. The device as recited in claim 7, wherein each of the second encoding engines becomes a second decoding engine when the finalized second redundant data bits are provided to the second encoding engine as the second inputs, and the second decoding engine detects and corrects with the finalized second redundant data bits a limited number of errors across the lines of original data bits being read from the storage medium.

10. The device as recited in claim 9, wherein the first decoding engine and/or the second encoding engines are repeatedly applied to the lines of original data bits to minimize possible errors occurred to the lines of original data bits.

11. The device as recited in claim 6, further comprises a compressing engine to compress the data set into a plurality of data segments in different data lengths in accordance with a compression algorithm, and wherein the operations further comprise reformatting the data segments in identical sizes, each reformatted data segment being a line of original data bits.

12. A method for managing a data set, the method comprising:

receiving in a first encoding engine successively lines of original data bits;

computing in the first encoding engine a set of first redundant data bits for a line of original data bits in accordance with a first predefined error detection correction (ECC) scheme, wherein a number of the first redundant data bits is predefined per the ECC scheme and dictates how many errors are correctable in the line of original data bits;

computing simultaneously in a linear array of second encoding engines an array of sets of second redundant data bits from the line of original data bit, each of the sets of second redundant data bits computed from a single bit from the line of original data bits in accordance with a second predefined error detection correction (ECC) scheme, wherein a number of the second redundant data bits in a set is predefined and dictates how many errors are correctable across all lines of original data bits; and revising respectively in the second encoding engines the sets of second redundant data bits with a corresponding data bit from a next line of the original data bits, wherein the sets of second redundant data bits are finalized with a last line of the original data bits.

13. The method as recited in claim 12, wherein the line of original data bits are all provided to the first encoding engine as first inputs thereto, the first redundant data bits are all provided to the first encoding engine as second inputs thereto, all values of the first redundant data bits are initially set to a known value.

14. The method as recited in claim 13, wherein the first encoding engine outputs finalized first redundant data bits, a codeword of the line of original data bits includes the finalized first redundant data bits.

15. The method as recited in claim 14, wherein each of the original data bits in the line is provided to one of the second encoding engines as a first input, the second redundant data bits are all provided to the one of the second encoding engines as second inputs thereto, all values of the second redundant data bits are initially set to a known value.

16. The method as recited in claim 15, wherein the second encoding engines output an array of intermediary second redundant data bits for the line of original data bits.

17. The method as recited in claim 16, wherein the array of intermediary second redundant data bits are finalized after the last line of the original data bits is accessed.

18. The method as recited in claim 17, wherein the first encoding engine becomes a first decoding engine when the finalized first redundant data bits are provided to the first encoding engine as the second inputs, and the method further comprising: detecting and correcting with the finalized first redundant data bits a limited number of errors in the line of original data bits being read from a storage medium.

19. The method as recited in claim 18, wherein each of the second encoding engines becomes a second decoding engine when the finalized second redundant data bits are provided to the second encoding engine as the second inputs, and the method further comprising: detecting and correcting with the finalized second redundant data bits a limited number of errors across the lines of original data bits being read from the storage medium.

20. The method as recited in claim 19, wherein the first decoding engine and/or the second encoding engines are repeatedly applied to the lines of original data bits to minimize possible errors occurred to the lines of original data bits.

* * * * *